Feb. 3, 1959     J. E. HEWSON     2,871,881
VALVE MANIFOLD

Filed Jan. 28, 1957     2 Sheets-Sheet 1

INVENTOR.
JOHN E HEWSON

BY *John N. Wildman*

ATTORNEY

Feb. 3, 1959   J. E. HEWSON   2,871,881
VALVE MANIFOLD

Filed Jan. 28, 1957   2 Sheets-Sheet 2

INVENTOR.
JOHN E. HEWSON

BY *John N. Widdowson*

ATTORNEY

United States Patent Office 2,871,881
Patented Feb. 3, 1959

2,871,881

VALVE MANIFOLD

John E. Hewson, Tulsa, Okla.

Application January 28, 1957, Serial No. 636,802

2 Claims. (Cl. 137—597)

This invention relates to valving. In a more specific aspect this invention relates to valving means for instrument installations. In a still more specific aspect, this invention relates to a manifold valve for installation in an instrument system for measuring and/or controlling fluid flow in a line, such fluids as liquids, gases, slurries, fluidized solids, and the like, specifically a valve manifold for installing between the differential pressure taps in a process line and the differential pressure transmitter to operatively connect the line taps and transmitter.

Differential pressure transmitters or cells to transmit pressure differential from the pressure taps of a fluid flow line are well known in the art, as are the means to establish the pressure differential, such as a flow nozzle, orifice, venturi and the like. These differential pressure transmitters can be and are usually remotely located from the flow meter or flow controller, being installed at or near the orifice plate or venturi section in the line. The fluid flowing in the line is in pressure communication with the differential pressure transmitter through conduits from the pressure taps in the line to the transmitter. Air or other gas is normally used to transfer pressure differential from the transmitter to the flow meter or controller on the instrument panel, or the like. In order to be able to check the transmitter and/or flow meter or controller, a bypass line with valve therein is usually connected between the conduits from the orifice plate taps and transmitter so that the pressure on both orifice flange conduits can be made equal to see if the transmitter and/or meter or controller indicates zero pressure differential. Also, valves are normally installed in these conduits so that the transmitter can be isolated. This usual piping and valving is difficult, expensive and time consuming to install and positioning the flow transmitter as desired is difficult; it provides a great number of potential leak points; it is a relatively weak point in the system from a structural standpoint; it takes up an unusual amount of room in the piping "alleyways"; it is difficult to steam trace to prevent freeze-ups; and it is difficult, time consuming and expensive to clean out when coking, liming, and the like, occurs, and to purge with such as cleaning fluid or compound when desired. The new valve manifold of my invention overcomes the many disadvantages and inconveniences of the prior art conduit and valve installation system. My new manifold valve is easy to install in any desired position and takes up a very minimum of space in the usual pipe "alleyway." In preferred specific embodiments of my new manifold valve means, I incorporate integral venting and draining means so that the valve and tap assembly can be vented and drained in any position, or these means can be used for filling the system when an isolating seal is desired. They are designed to provide for "rodding out," that is, forcing a rod through a bushed fitting, the valve parts in the manifold and into the process or flow line to remove coke, scale, waxy deposits, and the like. The new preferred specific embodiments of valve manifold of my invention provide for variable center line connections so that they can be used for any distance between orifice tap points. They are readily adapted for use in corrosive type service, being designed for backwelding of threaded connections to prevent leakage, and for mounting the main block valves with outside screws and yoke as required. My preferred specific embodiments have removable and replaceable valve seats which lend long life to the manifold, and allow for providing a great difference in hardness of valve seat and plug to prevent "galling" between seat and plug. It has been found that they can be made from standard bar metal stock because of my unique block body structure, or from a forged block either of which is economical. And, in either case the block body is drilled and tapped for steam tracing to prevent freeze up, such being easily done. The new manifold valve means of my invention has a body member with spaced passageways therethrough. Each of these passageways communicates between at least three different points outside the body member, and each passageway has one substantially straight pass through the body member. The body has a bypass passageway therein which connects between the first-named passageways. Valve means are mountable in the bypass passageway and the first-named passageways. The first-named passageways are adapted to receive conduit means in the outer portions, and the manifold valve is adapted to operatively connect a differential pressure transmsitter to the line pressure taps therefor.

It is an object of this invention to provide new valving means.

It is another object of this invention to provide new valving means for operatively installing fluid flow instrument metering and/or controlling means.

A furhter object of this invention is to provide a new unit manifold valve assembly for operatively connecting a fluid flow differential pressure transmitter to the process line pressure taps.

Yet another object of this invention is to provide a versatile, inexpensive, safe and efficient manifold valve assembly for installing differential pressure flow meter transmitters at the process line pressure taps.

Other objects and advantages of this invention will become apparent to those skilled in the art upon reading this disclosure.

Drawings accompany and are a part of this disclosure. These drawings depict preferred specific embodiments of the new valving means of my invention, and it is to be understood that such are not to unduly limit the scope of my invention. In the drawings, Fig. 1 is a plan view of a preferred specific embodiment of the new manifold valve of my invention shown in a preferred operative installation.

Figure 1:
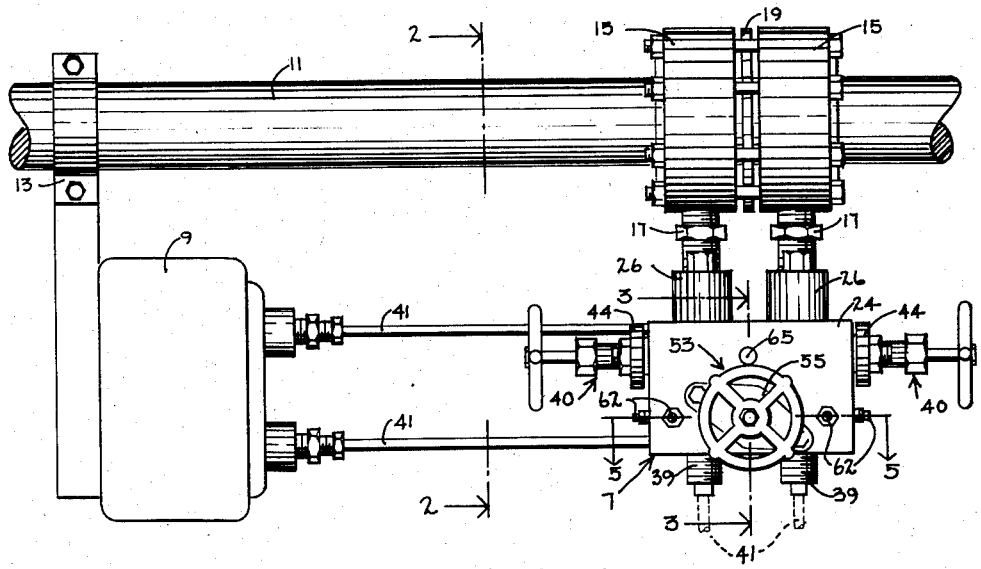

Following is a discussion and description of the new manifold valve means of my invention made with reference to the drawings whereon the same reference numerals are used to indicate the same or similar parts and/or structure. The discussion and description is of preferred specific embodiments of the new manifold valve means of my invention, and it is to be understood that such is not to unduly limit the scope of my invention.

Figures 2, 3:
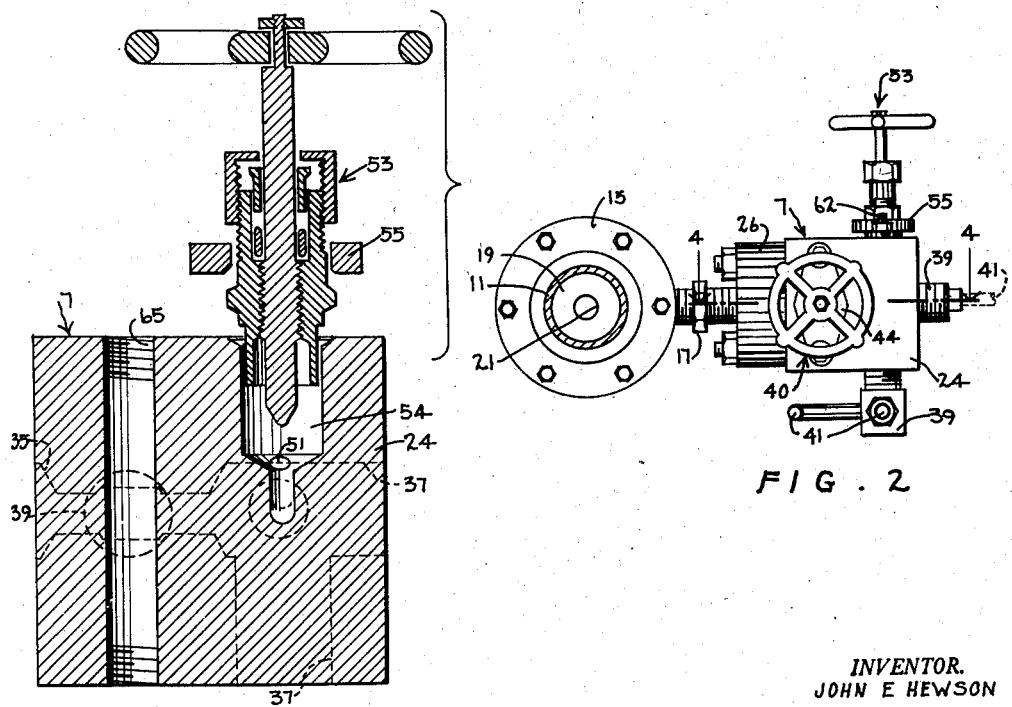
Fig. 2 is a view taken on line 2—2— of Fig. 1.
Fig. 3 is a view of the manifold valve proper taken on line 3—3 of Fig. 1.

The manifold valve assembly 7 shown in the drawings is operatively mounted between a usual and typical differential pressure transmitter 9 and process line 11 wherein flows the fluid the rate of flow of which is to be measured and/or controlled by flow meter and/or controller means (not shown) to which the transmitter 9 is operatively connected. Transmitter or cell 9 can conveniently be mounted in any desired position or location, the mounting member and pipe clamp 13 shown having been found desirable for the installation shown. Usual orifice flanges 15 having tap connections 17 are present in line 11. The flanges 15 mount and hold orifice plate 19 having orifice 21 therein (Fig. 2). The pressure pipe connections 17 from the orifice flanges 15 are connected to the body 24 of valve manifold 7 by the usual threaded flange connectors 26 which are bolted to body 7, and my manifold valve means permits using the usual connector flanges having off-set passageways 28, so that the distance between the center lines of the holes 28 in connectors 26 can be varied according to the position of the connectors to accommodate orifice flanges varying in distance between the center lines of the taps and thus the connecting means 17. I prefer to use connectors having hole 28 therein offset 1/16", thus allowing for varying the distance between holes 28 in the two connectors 26 a total of 1/4". The usual distance between the center line of holes 28 in connectors 26 is 2 1/8" plus or minus 1/8", as adjusted and desired, and I prefer to employ such connectors with my manifold valve 7. In connecting to body 24 of manifold valve 7, drilled plug 30 fitting into flange connector 26 and countersunk inlet portion 35 of the connecting passageway in body 24 is preferably used with O-ring type seal fitting therearound. I have found such a connection to be desirable. However of course, other attachment means can be used, if desired.

The outlet portions 37 of the connecting passageways through valve manifold body 24 are threaded to receive threaded connectors 39 which attach pressure transmission lines or tubing 41. Fluid in line 11 can then pass from the taps of orifice flanges 15 to flow transmitter 9, and lines 41 are connected to transmitter 9 in the usual and suitable manner.

The preferable one-piece metal valve manifold body 24 is conveniently made by drilling a block cut from standard bar stock or forged from steel to provide like parallel passageways having an inlet portion 35 and two outlet portions 37 at right angles to each other. The dual outlets 37 are preferably provided to connect lines 41 and transmitter 9 in any desired position. As shown, it is very preferable that one outlet 37 and inlet 35 be a straight pass through body member 24, so that in case of coking, scaling, or liming of the manifold valve passageway and/or the connecting line from the orifice flanges 15 to the manifold valve 7, a rod or similar member can be pushed or pounded therethrough to remove the coke, scale or lime deposit.

Figure 4:
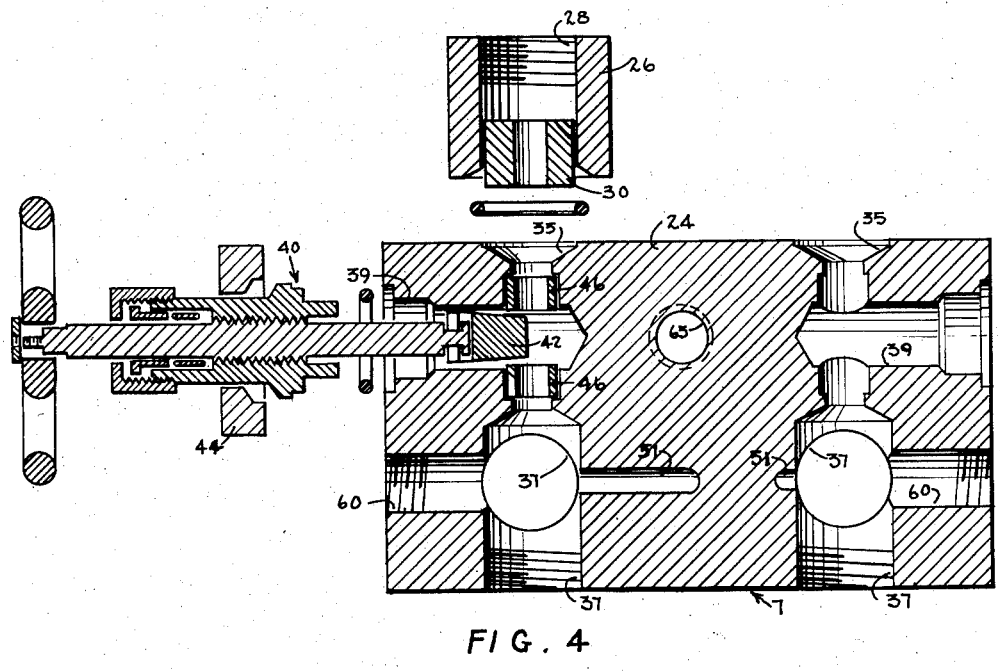
Fig. 4 is a partly exploded view taken on line 4—4 of Fig. 2 with the right side block or gate valve omitted, such being a duplication of the gate valve shown.
Figure 5:
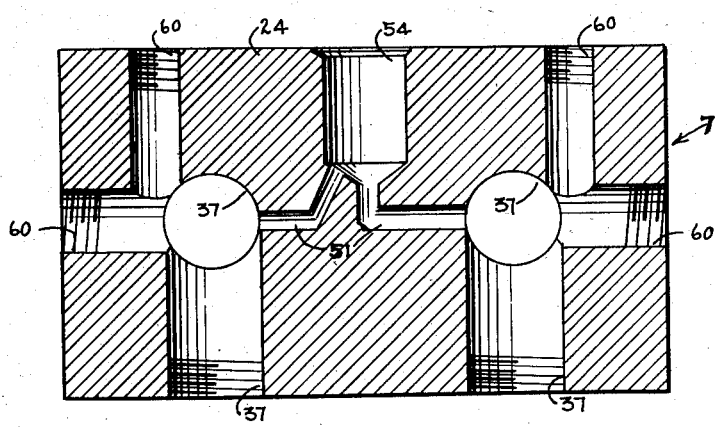
Fig. 5 is a view of the manifold valve body member taken on line 5—5 of Fig. 1.

The block body 24 of the valve manifold 7 is preferably drilled to provide holes 39 for mounting gate or block valves 40 therein, with the gate 42 of the valves positionable to close the inlet portions 35 of the passageways through the body 24 of the valve manifold. A gate valve 40 is mounted in each passageway, the right hand one in Fig. 4 being omitted for drawing convenience. I prefer that the gate 42 be made replaceable as shown, and that the valve 40 be mounted on the body 24 by outside yoke 44 bolted to the body which is usually required in corrosive service. However, common mounting with a threaded packing gland and female thread attachment means in the hole in body 24 can be used, if desired. The valve seats 46 (Fig. 4) are preferably made removable and replaceable to give long life to the manifold body, and by doing this, I have found that a great difference in hardness between valve gate 42 and seat 46 can be established to prevent "galling" between seat 46 and gate or plug 42.

A bypass passageway 51 is formed in body member 24 to connect the main fluid passageways, preferably this passageway 51 connects at the point of juncture of the outlet portions 37, so that the pressure on the fluid on both sides of the transmitter 9 can be equalized with zero differential no matter which outlet 37 is being used. A valve, preferably needle valve 53, is mounted in a hole 54 drilled in body 24 as shown to provide for opening and closing bypass passageway 51. Needle valve 53 can conveniently be mounted for corrosive service with outside yoke 55 and bolts as shown, or common threaded packing gland mounting means can be used, if desired.

The body member 24 is preferably drilled for drain and vent holes 60 which connect into outlet portions 37 of the main fluid passageways through the body 24. These holes 60 are threaded in the outer end portions to receive plugs 62. These integral venting and draining means are very advantageous, allowing for venting and draining the manifold valve in any position of installation. Also, these passageways are used for filling the valve passageways when a fluid isolating seal is desired between transmitter 9 and process line 11. And, if a purge of the assembly is desired, these inlets can be used to introduce the cleaning and purging liquid or gas.

My new valve manifold means preferably is drilled and tapped to provide steam chest or tracing passageway 65 for connection to a steam tracing line or system to prevent freeze up of fluid in the manifold body, etc. This has been found to be most convenient.

As will be evident to those skilled in the art, various modifications of this invention can be made, or followed, in the light of this disclosure and discussion, without departing from the spirit or scope of the disclosure or from the scope of the claims.

I claim:

1. A manifold valve for use in fluid flow instrument installations, comprising, in combination, a one-piece block manifold body, said body having a pair of like, spaced and parallel passageways therethrough, each of said passageways having an inlet portion and each of said inlet portions having a gate-type valve therein, said valves having removable and replaceable gates and valve seat members removably mounted in each of said passageways, each of said passageways having two outlet portions at right angles to each other with one outlet portion of each passageway in a straightline with said inlet portion thereof, a bypass passageway in said body communicating between said first-named passageways at the points of juncture of said outlet portions, a needle valve in said bypass passageway, each of said first-named passageways having a plurality of drain and vent passageways formed in said body and communicating between points outside said body and said points of juncture of said outlet portions of said passageways and removable plug means to close said drain and vent passageways, each of said outlet portions of said passageways being threaded in an outer portion to receive conduit attachment means, each of said inlet portions of said passageways being formed in an outer portion to receive conduit attachment means, and said manifold valve having means therewith constructed to mount said manifold valve between the pressure differential taps in a fluid flow conduit and a differential pressure transmitter therefor to operatively connect same with conduits connecting said inlet portions of said first-named passageways with said pressure taps and with other conduits connecting said differential pressure transmitter and a pair of said outlets of said first-named passageways.

2. A manifold valve for use in fluid flow instrument installations, comprising, in combination, a one-piece block manifold body, said body having a pair of spaced approximately parallel passageways therethrough, each of said passageways having an inlet portion and each of said inlet portions constructed to receive and mount valve means including valve seats, valve means including valve seats for each of said inlet portions of said passageways constructed to be removably mountable in said inlet portions, each of said passageways having a plurality of outlet portions with two of said outlet portions at approximately right angles to each other and with one of said two outlet portions of each passageway in approximately a straight line with said inlet portion thereof, a bypass passageway in said body communicating between said first-named passageways at approximately the points of juncture of said two outlet portions thereof, valve means in said bypass passageway constructed and operable to open and close said bypass passageway, each of said first-named passageways having a plurality of drain and vent passageways formed in said body and communicating between points outside of said body and said points of juncture of said two outlet portions of said passageways, and removable plug means constructed and mountable to close said drain and vent passageways, each of said outlet portions of said two passageways being constructed in an outer portion to receive conduit means, each of said inlet portions of said passageways being formed in an outer portion to receive conduit means, and said manifold valve having means therewith constructed to mount said manifold valve between the pressure differential taps in a fluid flow conduit and a differential pressure transmitter therefor to operatively connect same with conduits connecting said inlet portions of said first-named passageways with said pressure taps and with other conduits connecting said differential pressure transmitter and a pair of said outlets of said first-named passageways.

References Cited in the file of this patent

UNITED STATES PATENTS

| | | |
|---|---|---|
| 89,656 | Harbottle | May 4, 1869 |
| 1,462,857 | Hiller | July 24, 1923 |
| 2,250,700 | Borden | July 29, 1941 |
| 2,596,036 | MacDougall | May 6, 1952 |
| 2,678,802 | Adams | May 18, 1954 |

FOREIGN PATENTS

| | | |
|---|---|---|
| 1,044,952 | France | June 24, 1953 |